April 21, 1959   F. L. HAUSHALTER   2,882,747
VIBRATION DAMPER WITH COOLING ELEMENT
Filed May 22, 1957   2 Sheets-Sheet 1

INVENTOR
FRED L. HAUSHALTER

BY *Whittemore, Hulbert & Belknap*

ATTORNEYS

April 21, 1959  F. L. HAUSHALTER  2,882,747
VIBRATION DAMPER WITH COOLING ELEMENT
Filed May 22, 1957  2 Sheets-Sheet 2

INVENTOR
FRED L. HAUSHALTER

BY Whittemore, Hulbert & Belknap
ATTORNEYS

United States Patent Office 2,882,747
Patented Apr. 21, 1959

2,882,747
VIBRATION DAMPER WITH COOLING ELEMENT
Fred L. Haushalter, Pontiac, Mich.
Application May 22, 1957, Serial No. 660,792
7 Claims. (Cl. 74—574)

The present invention relates to vibration dampers and more particularly to apparatus for damping torsional and similar vibrations in the yieldable connections between elements which are movable relatively to each other and especially of the type disclosed in my co-pending application, Serial No. 419,225, filed March 29, 1954, now Patent No. 2,795,036, dated June 11, 1957. In the co-pending application there is described a pair of radially spaced concentric elements connected by an elastic member which has been forcibly inserted between the elements by stretching the member while it is being inserted. There results an assembled structure in which the relatively movable elements are held in assembled relationship by the elastic material, it being unnecessary to vulcanize or otherwise bond the material to the elements.

In vibration dampers of the type referred to, the constant and frequent deformation of the yielding connection generates considerable heat and, particularly at high rotational speeds, the elastic material will deteriorate to such an extent under these conditions to require replacement. It is one of the objects of the present invention to provide a vibration damper employing an elastic connection relatively movable between elements in which there is incorporated means for conducting and dissipating heat generated by deformation of the elastic material.

It is a further object of the invention to employ as heat dissipating means one of the members used to effect assembly of the elastic material and the connected elements.

It is still another object of the invention so to assemble the elements and elastic material that a substantial portion of the heat dissipating member is embedded in the yieldable damper, the remainder thereof extending into the surrounding air.

Other objects will be apparent from the following description of the invention when taken with the accompanying drawings illustrating several forms thereof and in which Fig. 1 is a longitudinal sectional view of one form of apparatus employed to assemble the damper and the relatively movable elements;

Figure 1:
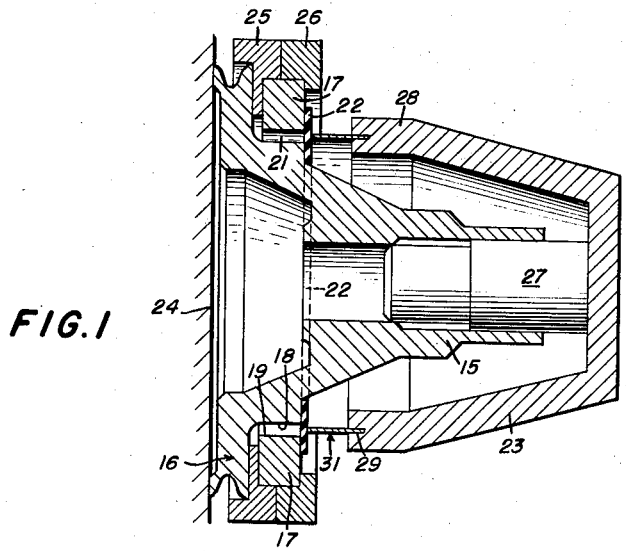

Referring to Fig. 1 of the drawings it will be seen that the hub 15 of a rotary element such as a pulley 16 is surrounded by an inertia member in the form of a ring 17. The diameter of seat 18 on the hub is somewhat less than that of the inner surface 19 of the ring 17, providing an annular space 21 between the ring and the hub. This space is adapted to be filled by an annulus 22 of elastic relatively non-compressible material, such as rubber, thus forming a yielding connection between the hub and inertia member. As shown in Fig. 1 the annulus is formed of flat sheet material which is folded back upon itself, as shown in others of the figures, to provide a double thickness of material between the opposing surfaces of the hub and inertia ring. This double thickness of the folded ring is substantially greater than the width of the space 21. Hence the ring must be forced into the space between the hub and inertia member. For the purpose of inserting the elastic annulus into the annular space 21 there is provided a presser head 23, support 24 and spacer rings 25, 26, the latter being suitably clamped together. Ring 25 fits over pulley 16 to maintain the spacer rings and inertia member in concentric relation with the hub. Head 23 is provided with a centering shaft 27 and an annular flange 28 concentric with the shaft. An annular groove 29 in flange 28 is also concentric with shaft 27 and accommodates a cylindrical steel sleeve 31 which, when centered, registers with space 21. Sleeve 31 is relatively thin so that it is adapted freely to enter the annular space 21. As shown in Fig. 1, the elastic annulus is initially in the form of a flat centrally apertured disc bridging space 21. As this disc is engaged by sleeve 31 and forced into the space, it is stretched and folded upon itself as shown in others of the figures.

Figure 2:
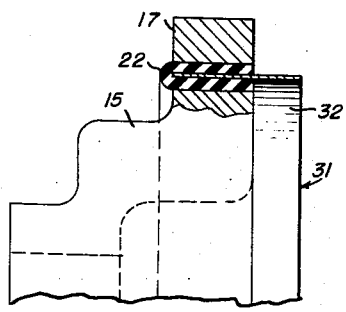
Fig. 2 is a partial sectional view of one form of the assembled elements and damping device.
Figure 3:
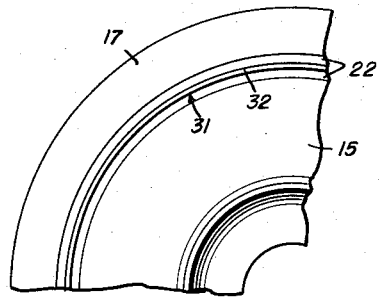
Fig. 3 is a partial front view of the structure shown in Figure 2.

The elastic material is placed under tension in this operation and completely fills space 21, forming an effective and yielding coupling having direct frictional contact with the hub and inertia member. The width of sleeve 31 is greater than that of inertia member 17 and so fits into groove 29 that when the presser head is removed sleeve 31 remains firmly embedded in the elastic material. As shown in the several views, a substantial portion of the metal sleeve, corresponding approximately with the width of the inertia member, remains in the elastic annulus while the remainder of the sleeve projects axially beyond hub 15. In Figs. 2 and 3 the projecting or free portion of sleeve 31 is indicated at 32 and its surface is unaltered. This free portion nevertheless extends sufficiently beyond the hub that it is capable of conducting a substantial degree of the heat generated in the elastic damper when the hub is rotating at high speeds and rapid distortions of the damper occur.

Figure 4:
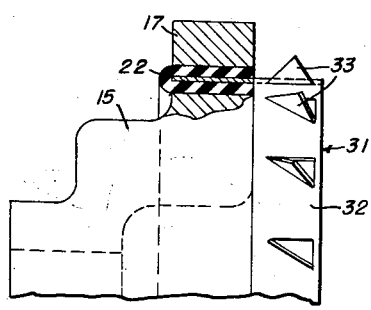
Fig. 4 is a fragmentary sectional view of another form of the invention.
Figure 5:
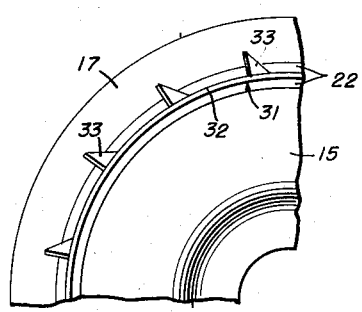
Fig. 5 is a fragmentary front view of the assembly shown in Fig. 4.

In Figs. 4 and 5 it will be seen that triangular tongues 33 are struck from the metal sleeve and extend in a generally outwardly radial direction. These tongues or fins further act as heat dissipating elements and function as the vanes of a centrifugal pump when the hub is rotated. It will also be noted that the tongues are inclined to the free edge of the sleeve so that when the damper, as seen in Fig. 5, rotates in a clockwise direction, the air impinging on the tongue tends to force the sleeve into the damper.

Figure 6:
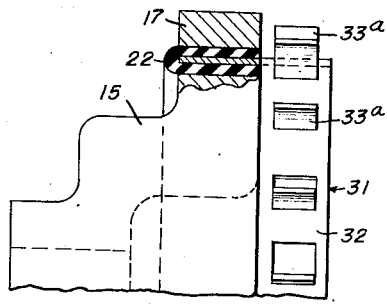
Fig. 6 is a fragmentary sectional view of a further modification of the invention.
Figure 7:
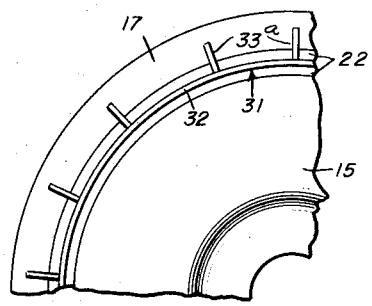
Fig. 7 is a fragmentary front view of the elements and inserts shown in Fig. 6.

Figs. 6 and 7 illustrate another modification of the invention in which the struck-out tongues 33a are rectangular and project radially outwardly. In this form of the sleeve the tongues also have the effect of a centrifugal pump.

Figure 8:
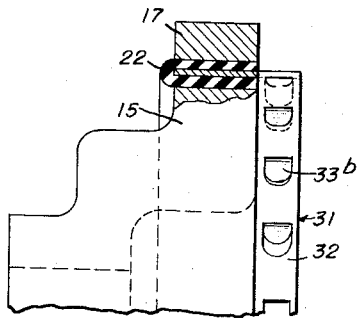
Fig. 8 is a fragmentary sectional view of still another embodiment of the invention.
Figure 9:
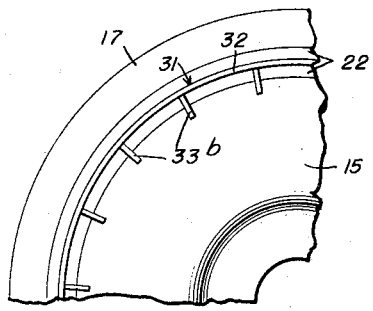
Fig. 9 is a fragmentary front view corresponding to Fig. 8.

Another embodiment of the ring wherein struck-out tongues 33b project in an inwardly radial direction is shown in Figs. 8 and 9.

Figure 10:
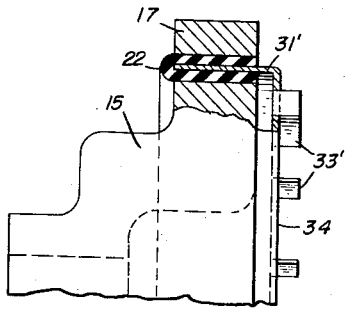
Fig. 10 is a fragmentary sectional view of another modification of the assembly.
Figure 11:
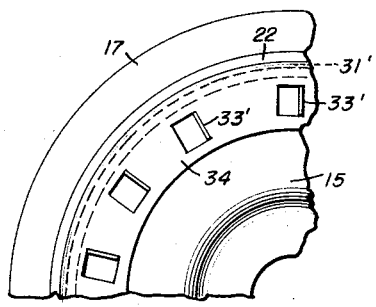
Fig. 11 is a fragmentary front view of the structure shown in Fig. 10.

A further modification of the heat dissipating element is shown in Figs. 10 and 11, the element in this case being cup-shaped with an inwardly extending flange 34 connected to the embedded flange 31'. Tongues 33' are struck from flange 34 and extend axially therefrom. In this form of the invention the presser head will be modified properly to support the metal sleeve before and during insertion of the elastic annulus.

In the several embodiments of the invention, the metal sleeve employed to insert and stretch the elastic material is of sufficient length axially to project beyond the coupling while having a substantial portion thereof firmly embedded and in intimate contact with the elastic material. The sleeve thereby acts to conduct heat from the interior of the coupling into the surrounding atmosphere. At the same time while the hub and inertia members are rotating the flow of air over the surface of the heat dissipating sleeve further carries away heat generated in the coupling. Additional heat conducting means are provided by the tongues struck from the sleeve so that an effective cooling of the sleeve and the elastic material is obtained.

What is claimed is:

1. In combination with a member rotatable about a predetermined axis and having a cylindrical surface concentric with said axis, an inertia element having a cylindrical surface surrounding the first mentioned cylindrical surface in spaced concentric relationship to the latter surface, a concentric metal sleeve extending into the space between said surfaces, and an elastic annulus folded over said sleeve and held under tension between opposite sides of the sleeve and the adjacent cylindrical surfaces to form a yieldable connection between said surfaces, said sleeve having a free portion extending axially a substantial distance from said rotatable member and said inertia element into the surrounding atmosphere, said portion being provided with circumferentially spaced tongues.

2. The combination defined in claim 1 in which the tongues extend radially with respect to the axis of said sleeve.

3. The combination defined in claim 2 in which the tongues extend radially outwardly with respect to the axis of said sleeve.

4. The combination defined in claim 2 in which the tongues extend radially inwardly with respect to the axis of said sleeve.

5. The combination defined in claim 1 in which the tongues extend axially with respect to the axis of said sleeve.

6. The combination defined in claim 1 in which said free portion is provided with a radially extending flange and in which said flange is deformed to provide circumferentially spaced integral tongues extending axially from said flange.

7. The combination defined in claim 2 in which the tongues extend radially and the faces of said tongues are oblique to the peripheral edge of said free portion, whereby air impinging on the tongues exerts a force on said sleeve in the direction toward said elastic annulus.

References Cited in the file of this patent

UNITED STATES PATENTS

| | | |
|---|---|---|
| 2,514,136 | O'Connor | July 4, 1950 |
| 2,594,555 | Hardy | Apr. 29, 1952 |
| 2,636,399 | O'Connor | Apr. 28, 1953 |
| 2,795,036 | Haushalter | June 11, 1957 |
| 2,795,037 | Haushalter | June 11, 1957 |